US010588301B2

(12) United States Patent
Tsutsumi et al.

(10) Patent No.: US 10,588,301 B2
(45) Date of Patent: Mar. 17, 2020

(54) SPINNING REEL FOR FISHING

(71) Applicant: GLOBERIDE, Inc., Tokyo (JP)

(72) Inventors: Wataru Tsutsumi, Tokyo (JP);
Kazuyuki Matsuda, Tokyo (JP);
Yoshihito Shimizu, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 16/307,065

(22) PCT Filed: Jan. 11, 2017

(86) PCT No.: PCT/JP2017/000665
§ 371 (c)(1),
(2) Date: Dec. 4, 2018

(87) PCT Pub. No.: WO2017/212672
PCT Pub. Date: Dec. 14, 2017

(65) Prior Publication Data
US 2019/0133102 A1 May 9, 2019

(30) Foreign Application Priority Data
Jul. 29, 2016 (JP) ................................. 2016-150540

(51) Int. Cl.
*A01K 89/01* (2006.01)
(52) U.S. Cl.
CPC ........ *A01K 89/01082* (2015.05); *A01K 89/01* (2013.01); *A01K 89/011221* (2015.05)
(58) Field of Classification Search
CPC ........ A01K 89/01123; A01K 89/01126; A01K 89/011223; A01K 89/01924
See application file for complete search history.

(56) References Cited

U.S. PATENT DOCUMENTS 3,224,703 A * 12/1965 Clark ................. A01K 89/0102
242/242
5,289,990 A * 3/1994 Kawabe ........... A01K 89/01084
242/233

(Continued)

FOREIGN PATENT DOCUMENTS

FR 1374520 A 10/1964
JP 2001-346484 A 12/2001

(Continued)

OTHER PUBLICATIONS

International Search Report PCT/JP2017/000665 dated Feb. 28, 2017 with English translation.

(Continued)

*Primary Examiner* — Emmanuel M Marcelo
(74) *Attorney, Agent, or Firm* — DLA Piper LLP (US)

(57) ABSTRACT

A meshed state between a drive gear and a pinion gear can be maintained with high accuracy, and rigidity of a reel body is increased. Entry of dust and water between a side opening portion and a lid member is prevented and tangling of a fishing line is avoided. A fishing spinning reel includes a lid member closing a side opening portion provided in a body and a handle shaft is rotatably supported by at least the lid member. A female screw portion is provided on the side opening portion, and a male screw portion is provided on the lid member. There are provided a drive gear, a pinion gear meshed with the drive gear, a front bearing rotatably supporting a front portion of the pinion gear, and a rear bearing rotatably supporting a rear portion thereof.

11 Claims, 12 Drawing Sheets

(56) References Cited

U.S. PATENT DOCUMENTS

| | | | |
|---|---|---|---|
| 6,176,446 B1* | 1/2001 | Sato | A01K 89/011221 |
| | | | 242/319 |
| 9,642,348 B2* | 5/2017 | Niitsuma | A01K 89/015 |
| 2004/0200915 A1* | 10/2004 | Nishikawa | A01K 89/006 |
| | | | 242/282 |
| 2009/0127367 A1* | 5/2009 | Tsutsumi | A01K 89/01555 |
| | | | 242/286 |
| 2015/0048193 A1 | 2/2015 | Matsuo et al. | |

FOREIGN PATENT DOCUMENTS

| | | |
|---|---|---|
| JP | 2012-029650 A | 2/2012 |
| JP | 2015-035987 A | 2/2015 |

OTHER PUBLICATIONS

[DAIWA] 16 Certate o Kao Mae ni Kanarazu Kakunin Shital Koto, published on Jan. 16, 2016, pp. 1-6 "Monocoque Body" with partial English translation.

Notice of Reasons for Refusal dated Oct. 29, 2019, of counterpart Japanese Application No. 2016-114489, along with an English translation.

The Extended European Search Report dated Dec. 20, 2019, of counterpart European Application No. 17809856.2.

\* cited by examiner

SPINNING REEL FOR FISHING

CROSS-REFERENCE TO RELATED APPLICATIONS

This application is the U.S. National Phase Application of PCT/JP2017/000665, filed Jan. 11, 2017, which is based on and claims the benefit of priority from Japanese Patent Application Serial No. 2016-114489 filed Jun. 8, 2016, and Japanese Patent Application Serial No. 2016-150540, filed Jul. 29, 2016. The contents of each is incorporated herein by reference in entirety.

TECHNICAL FIELD

The present invention relates to a fishing spinning reel.

BACKGROUND

Typically, a fishing spinning reel is configured by including a reel unit, a rotor rotatably provided at a front portion of the reel unit, and a spool provided so as to be movable in a front-rear direction in synchronization with rotary movement of the rotor and holding a fishing line wound thereon via the rotor.

As such a fishing spinning reel, there is known a type having a reel unit composed of a body and a lid member, the lid member closing a side opening portion formed at a side portion of the body, as disclosed in Patent Literature 1. A handle shaft with a handle for driving a reel mounted thereto is rotatably supported by the body and the lid member. The lid member is mounted to the body by using a plurality of screws firmly fastened around the side opening portion of the body.

Furthermore, a drive gear mounted to the handle shaft is meshed with a pinion gear for driving a rotor. The pinion gear is supported at its front portion to the body via a bearing. As a support structure of the pinion gear, in order to increase accuracy in supporting the pinion gear, consideration has been given also to supporting the pinion gear at both its front and rear portions via bearings.

RELEVANT REFERENCES

List of Relevant Patent Literatures

Patent Literature 1: Japanese Patent Application Publication No. 2001-346484

SUMMARY

The lid member as a component of the reel unit is firmly fastened with the plurality of screws around the side opening portion of the body. Because of this, when a large winding load is generated at a support portion of the handle shaft during a handle operation, since strength in fastening the lid member by using the plurality of screws spaced from each other is not sufficient, there might occur a trouble such as deformation of the lid member, generation of a gap at a portion of the lid member where the lid member is mounted to the body, or deformation of the body under an influence of deformation of the lid member. When such a trouble occurs, it becomes no longer possible to maintain a meshed state with high accuracy, possibly leading to degraded rotational performance between the drive gear and the pinion gear or decreased strength and durability of the gears.

The present invention is intended to solve the above-described problem, and an object thereof is to provide a fishing spinning reel capable of maintaining a meshed state between a drive gear and a pinion gear with high accuracy and also of increasing strength of a reel unit.

In order to achieve the above-described object, a fishing spinning reel of the present invention is provided with a reel unit including a body and a lid member, the lid member closing a side opening portion provided at a side portion of the body, and a handle shaft is rotatably supported by at least the lid member. The side opening portion and the lid member are circular in shape. A female screw portion is provided on an inner peripheral portion of the side opening portion, and a male screw portion is provided on an outer peripheral portion of the lid member and screwed into the female screw portion. The fishing spinning reel is provided with a drive gear driven to rotate via the handle shaft and a pinion gear meshed with the drive gear. The fishing spinning reel is provided with a front bearing rotatably supporting a front portion of the pinion gear and a rear bearing rotatably supporting a rear portion of the pinion gear.

In this fishing spinning reel, the lid member itself can be firmly fastened to the side opening portion by being screwed thereinto. Further, the pinion gear can be supported by both the front bearing and the rear bearing.

Furthermore, preferably, the handle shaft is supported at a center portion of the lid member. By this configuration, concentricity between the lid member and the handle shaft can be achieved.

Furthermore, preferably, the rear bearing is positioned inside the side opening portion. By this configuration, the rear bearing can be installed through the side opening portion.

Furthermore, preferably, a support portion supporting the handle shaft is provided in the body, and a handle shaft bearing supporting the handle shaft is disposed in the support portion. In this case, preferably, the rear bearing or a support member supporting the rear bearing overlaps with at least part of the handle shaft bearing as viewed from an axial direction of the handle shaft. By this configuration, the rear bearing can be disposed by utilizing a space situated lateral to the handle shaft bearing.

Furthermore, preferably, a position where the side opening portion and the lid member are screwed with each other is situated lateral to the pinion gear and between a position where the pinion gear is supported by the front bearing and a position where the drive gear is meshed with the pinion gear. By this configuration, the position where the side opening portion and the lid member are screwed with each other is arranged lateral to the pinion gear and at a position in a vicinity of the front bearing. Furthermore, the position where the side opening portion and the lid member are screwed with each other is arranged at a position in a vicinity of the position where the pinion gear is meshed with the drive gear.

Furthermore, in the lid member, there could be formed a contact portion for obtaining concentricity with the side opening portion by coming in contact with an inner peripheral surface of the side opening portion. By this configuration, a center of the side opening portion agrees with a center of the lid member.

Furthermore, preferably, in a case where a spool reciprocation device is housed and supported inside the side opening portion, at a rear portion of the body, there is formed a rear opening portion for receiving at least part of a constituent member of the spool reciprocation device so that the constituent member is disposed on a rear side. Furthermore, preferably, the bridge portion extends between the side opening portion and the rear opening portion, and there is provided a bridge portion forming an opening end edge of each of the side opening portion and the rear opening portion.

By this configuration, a constituent member of a desired size can be used without being limited by a size of a space in the reel unit. Furthermore, with the bridge portion provided, strength of the body is improved. Furthermore, the bridge portion is formed, and thus the side opening portion can be formed so as to be continuous in a circumferential direction, in other words, the side opening portion can be formed in a circular shape.

Furthermore, preferably, in a case of including a spool shaft supported to the body so as to be freely slidable forward and rearward, a rear portion of the spool shaft being positioned in the body, the spool reciprocation device includes a slider caused to move forward and rearward together with the spool shaft by rotation of the handle shaft and a guide shaft guiding the slider to slide in a front-rear direction. In this case, preferably, with respect to the handle shaft, the rear portion of the spool shaft and the guide shaft are disposed so as to be separated on a lower side and an upper side, respectively, and a concave portion receiving at least part of the handle shaft is formed in a portion of the slider opposed to the handle shaft.

By this configuration, when the handle shaft is disposed at a central portion of a space inside the body having the circular side opening portion formed therein, upper and lower inside spaces are formed with respect to the handle shaft. Thus, it becomes possible to dispose the guide shaft and the spool shaft in the upper and lower inside spaces, respectively, so that they are separated in a balanced manner, the guide shaft being used to guide the slider of the spool reciprocation device to slide, the spool shaft being coupled to the slider and causing a spool to move forward and rearward.

Furthermore, preferably, in a case where the body includes a wall portion and a tube portion extending from the wall portion, the side opening portion is provided at an end portion of the tube portion. Furthermore, preferably, the lid member itself is firmly fastened to the side opening portion by being screwed thereinto, and a support rib extending in a top-bottom direction is disposed on an inner side of the tube portion, an upper end portion and a lower end portion of the support rib being connected to an inner peripheral surface of the tube portion, so that the tube portion and the support rib are provided so as to be integral with each other. By this configuration, the tube portion of the body is reinforced by the support rib extending in the top-bottom direction.

Furthermore, preferably, the support rib is provided in a protruding manner so as to be integral with the wall portion. By this configuration, strength of the wall portion can be ensured.

Furthermore, preferably, the support rib supports the rear bearing. By this configuration, strength in supporting the pinion gear can be increased.

According to the present invention, with respect to the side opening portion provided at the side portion of the body, the circular lid member is firmly screwed thereinto with a fastening force uniform in the circumferential direction, and thus sufficient strength in mounting the lid member can be ensured. Since sufficient strength in mounting the lid member can be ensured, accuracy in supporting the handle shaft and, therefore, accuracy in supporting the drive gear meshed with the pinion gear are improved and maintained. Furthermore, the circular lid member is mounted by being screwed, so that the side opening portion of the body is reinforced, and strength of the body itself is also improved. Thus, it also becomes possible to adopt a large-diameter drive gear. Furthermore, the need for a plurality of screws or the like for securing the lid member to the body can be eliminated, so that the number of components required can be reduced, and incorporation workability and dismantling workability are improved. Furthermore, breakage of screws can also be prevented. Moreover, the lid member and the side opening portion are circular in shape, and thus a load exerted from the lid member on the side opening portion (for example, a load generated during a handle operation) is dispersed uniformly over an entire circumference of the side opening portion. For this reason, a load (stress) is hardly concentrated on one part of the body (the side opening portion), and thus excellent durability of the body is obtained.

Meanwhile, with the front bearing and the rear bearing provided, accuracy in supporting the pinion gear can be increased. Thus, accuracy in meshing (a meshed state) between the pinion gear and the drive gear is maintained to be high, and thus improved rotational performance, maintained gear strength, and moreover, improved durability can be achieved. Furthermore, the body itself is improved in strength and durability by mounting the lid member thereto, and thus accuracy in supporting the pinion gear by using the front bearing and the rear bearing is further improved.

Furthermore, with the handle shaft supported at the center portion of the circular lid member, concentricity between the lid member and the handle shaft can be maintained with high accuracy, and thus accuracy in supporting the handle shaft and, therefore, accuracy in supporting the drive gear meshed with the pinion gear are increased.

Furthermore, the rear bearing is positioned inside the side opening portion, and thus the rear bearing can be installed through the side opening portion, so that excellent installability is obtained. Furthermore, the rear portion of the pinion gear can be disposed inside the rear opening portion, and thus the pinion gear can be constrained from extending out forward in the body. Accordingly, a size reduction of the body can be achieved.

Furthermore, the support portion supporting the handle shaft is provided in the body, and the rear bearing overlaps with at least part of the handle shaft bearing disposed in the support portion as viewed from the axial direction of the handle shaft, and thus the rear bearing can be disposed by utilizing a space lateral to the handle shaft bearing. Thus, space saving in the body (in the side opening portion) can be achieved. Furthermore, it is also possible to attach the handle shaft bearing from an external side of the body.

Furthermore, the position where the side opening portion and the lid member are screwed with each other is arranged at a position in the vicinity of the front bearing, and thus, with the lid member secured by being screwed, reinforcement around the front bearing can be achieved. Particularly in a case where the side opening portion is increased in diameter and a large-diameter drive gear is used, the side opening portion is positioned lateral to the front bearing, so that a thickness of a region around the front bearing might be relatively reduced. However, with the lid member secured by being screwed, reinforcement around the front bearing can be achieved. Accordingly, it is possible to reinforce a support structure of the front bearing and thus to improve rotational performance of the pinion gear and durability thereof. Meanwhile, the position where the side opening portion and the lid member are screwed with each other is arranged at a position in the vicinity of the position where the drive gear is meshed with the pinion gear, and thus a load inputted at the meshing position from the drive gear to the pinion gear can be favorably received by the front bearing and a securing structure of the lid member situated lateral to the front bearing. Accordingly, it is possible to improve rotational performance of the pinion gear and durability thereof.

Furthermore, a contact portion for obtaining concentricity with the side opening portion is formed in the lid member, and thus the center of the side opening portion agrees with the center of the lid member. This prevents the handle shaft from tilting, thus stabilizing and improving rotation operability of a handle and meshing performance of the drive gear.

Furthermore, since the rear opening portion is provided, a constituent member of a desired size can be used without being limited by a size of a space in the reel unit, and thus the degree of design freedom is increased. Furthermore, at least part of the constituent member can be disposed on a rear side in a rear portion of the reel unit, and thus a size reduction of the reel unit can be achieved. Furthermore, a forward-rearward stroke of the spool reciprocation device can be favorably ensured by effectively utilizing a space on the rear side in the rear portion of the reel unit. Furthermore, with the bridge portion provided, strength of the rear portion of the body can be ensured, and thus operation performance of the spool reciprocation device and, therefore, quality of a winding operation can be improved.

Furthermore, with respect to the handle shaft, the guide shaft of the spool reciprocation device and the spool shaft can be disposed in the upper and lower inside spaces, respectively, so that they are separated in a balanced manner, and thus it is possible to ensure a sufficient forward-rearward stroke of the spool while achieving a size reduction of the reel unit. Furthermore, the drive gear having an outer diameter of a shape similar to that of the circular side opening portion can be housed, and thus the drive gear can be increased in diameter as much as possible, while a size reduction of the reel unit can be achieved. Accordingly, it becomes possible to maintain a high-speed gear ratio and strength.

Furthermore, sufficient strength of the tube portion of the body can be ensured by the support rib extending in the top-bottom direction. Accordingly, strength of the reel unit can be increased. Since strength of the reel unit can be increased, accuracy in supporting the handle shaft is improved and maintained. Furthermore, the lid member is mounted by being screwed, so that the side opening portion of the body is reinforced, and strength of the body itself is also improved. Thus, it also becomes possible to adopt a large-diameter drive gear as the drive gear supported to the handle shaft. Furthermore, the need for a plurality of screws or the like for securing the lid member to the body can be eliminated, so that the number of components required can be reduced, and incorporation workability and dismantling workability are improved. Furthermore, breakage of screws can also be prevented.

DESCRIPTION OF THE EMBODIMENTS

Figure 1:
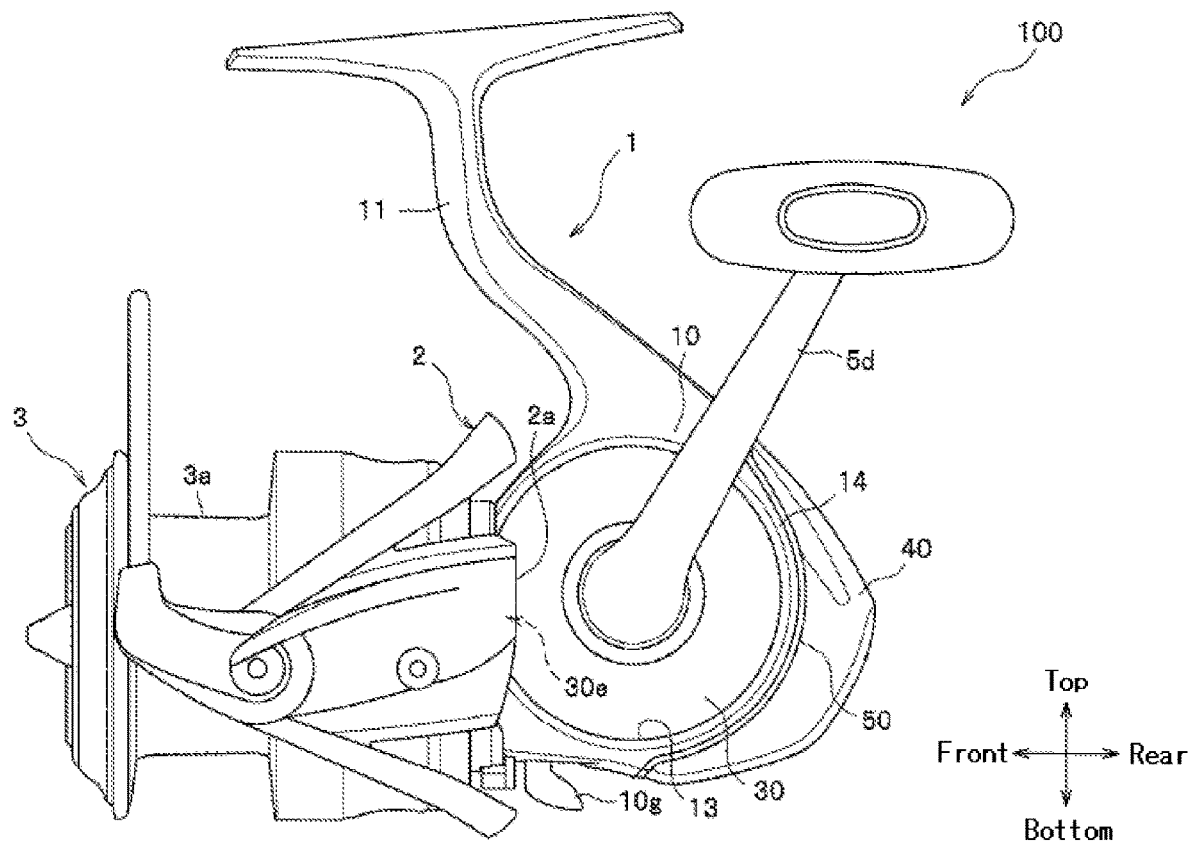
FIG. 1 is a side view showing an entire configuration of a fishing spinning reel according to one embodiment of the present invention.

Embodiments of a fishing spinning reel according to the present invention will be now described with reference to the drawings. Across the embodiments, the same elements are denoted by the same reference characters, and duplicate descriptions thereof are omitted. In the following descriptions, terms "front-rear" and "top-bottom" refer to directions shown in FIG. 1, and a term "left-right" refers to a direction shown in FIG. 4.

As shown in FIG. 1, a fishing spinning reel 100 is provided primarily with a reel unit 1, a rotor 2 rotatably provided on a front side of the reel unit 1, and a spool 3 provided so as to be movable in a front-rear direction in synchronization with rotary movement of the rotor 2.

Figure 2:
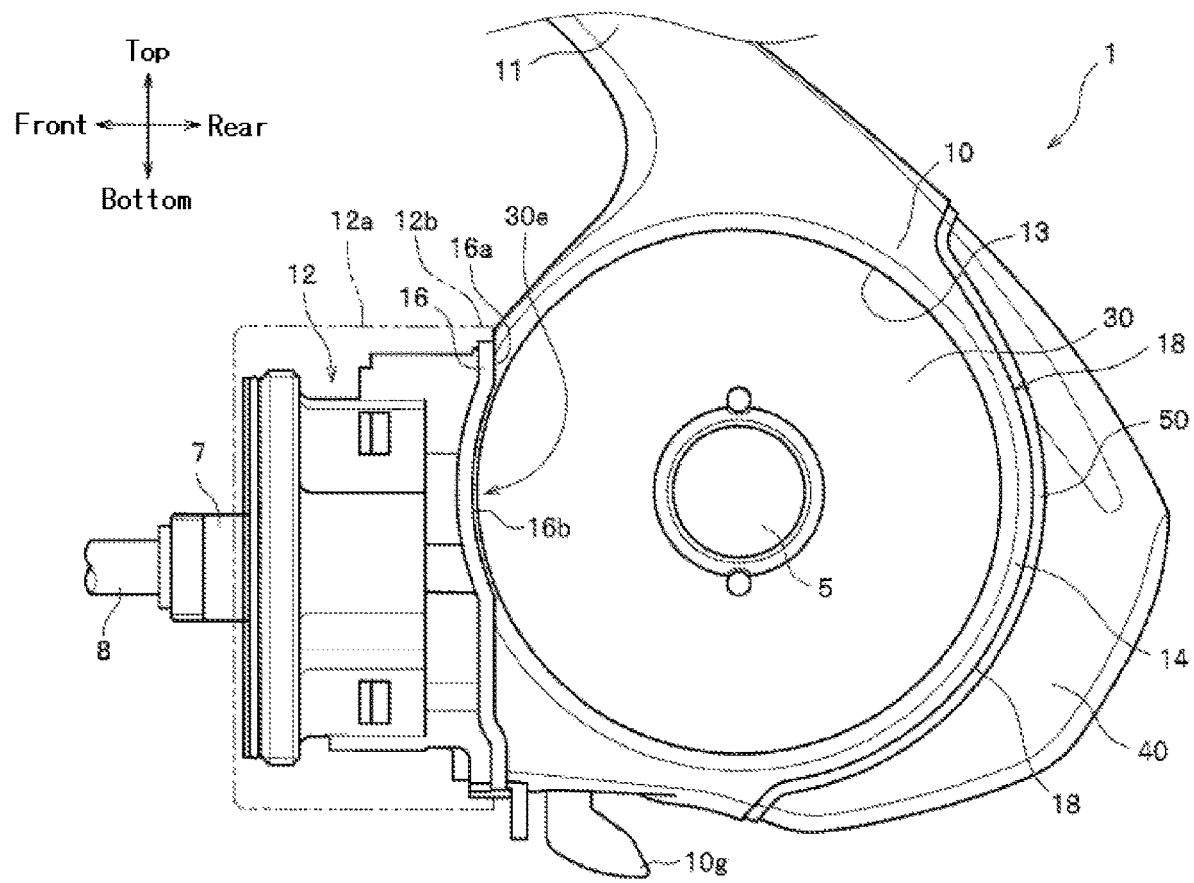
FIG. 2 is a side view showing a reel unit.

As shown in FIG. 2, the reel unit 1 is provided with a body 10 formed in a substantially circular outer shape in side view and a lid member 30 formed at a left side portion of the body 10 and closing a side opening portion 13. The side opening portion 13 and the lid member 30 are each formed in a circular shape in side view. A leg portion 11 (see FIG. 1) attached to an unshown fishing rod is formed at an upper portion of the body 10 so as to be integral therewith. A tubular body front portion 12 is provided at a front portion of the body 10. A protective cover 40 is attached to a rear portion of the body 10 via a seal member 50. In FIG. 1 and FIG. 2, a side shape of the lid member 30 is shown in a simplified manner.

Figure 3:
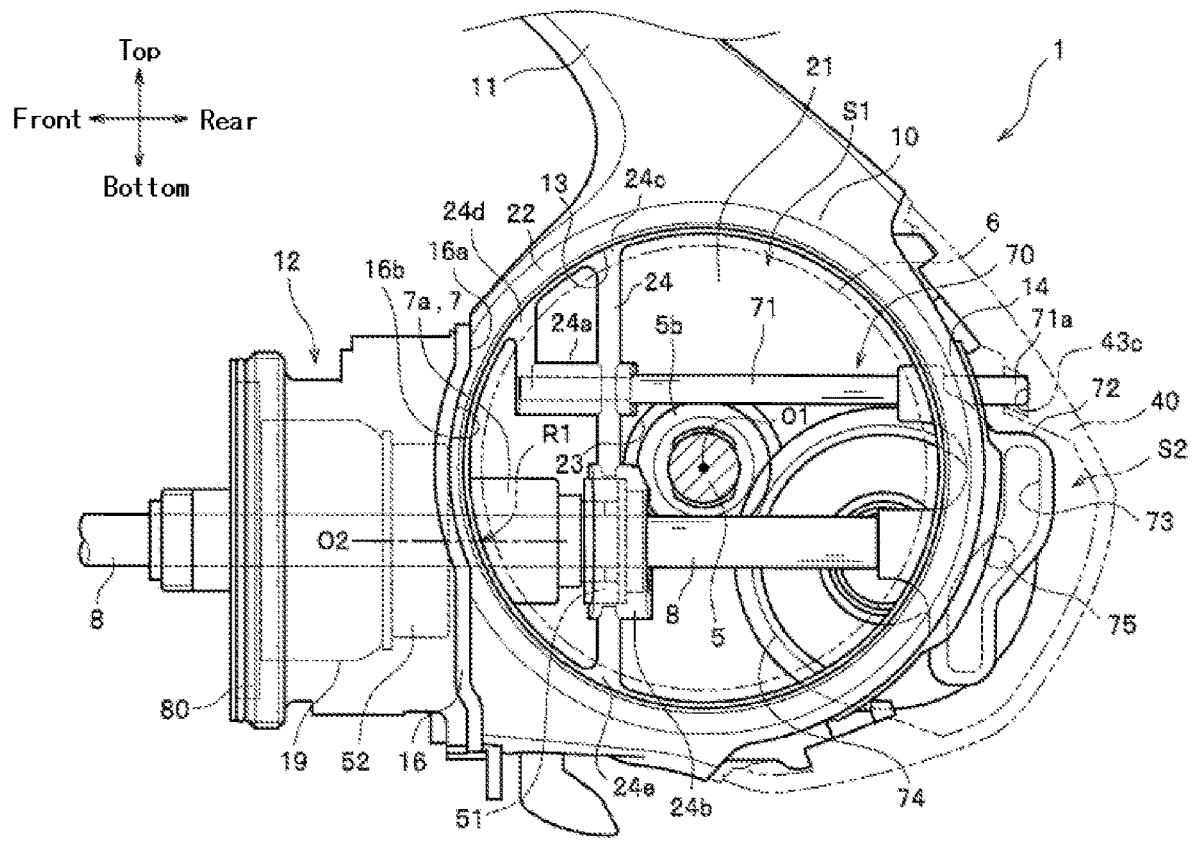
FIG. 3 is a side view of the reel unit from which a lid member has been removed.
Figure 4:
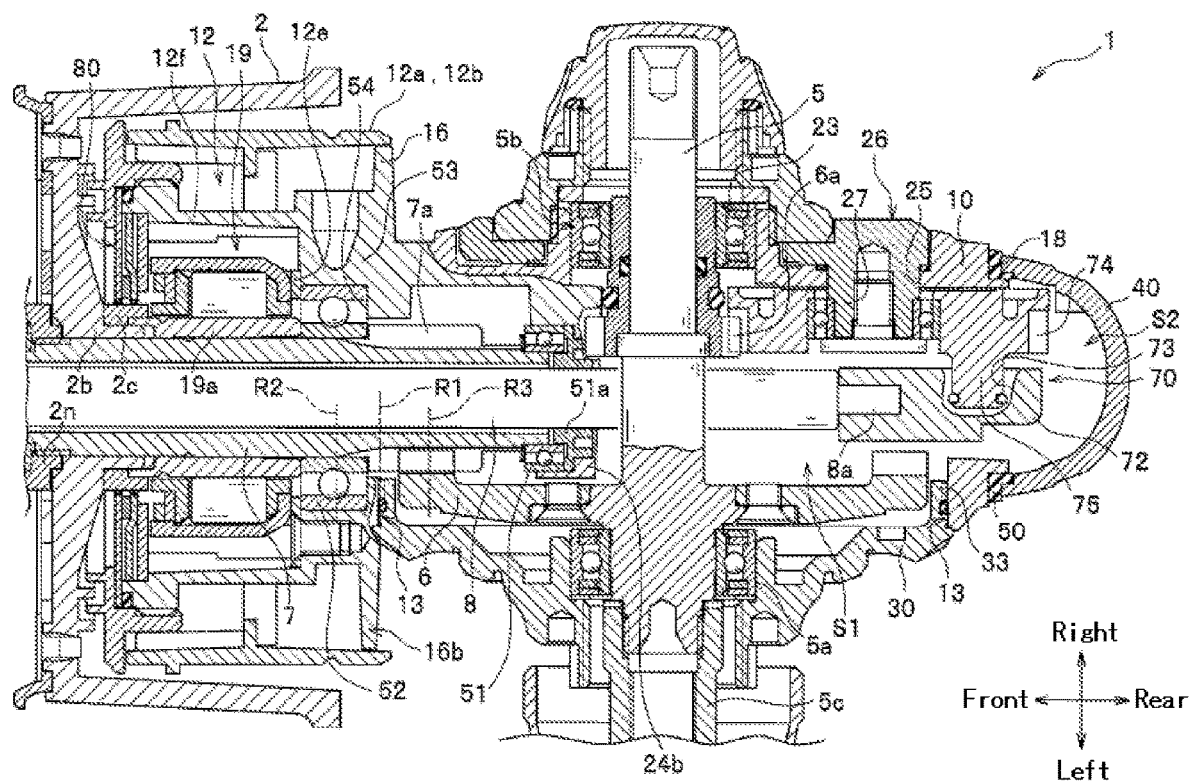
FIG. 4 is a cross-sectional view showing an internal structure.

As shown in FIG. 3, in the body 10, there is formed a housing space S1 having an opening that is the side opening portion 13 and surrounded by a wall (an inner peripheral surface 22*a* of an after-mentioned tube portion 22) in a substantially cylindrical shape with a bottom (see FIG. 4). In the housing space S1, there are disposed a rear portion of a drive shaft sleeve 7, a rear portion of a spool shaft 8 inserted through the drive shaft sleeve 7, and a spool reciprocation device 70 for causing the spool shaft 8 (a spool 3, see FIG. 1) to reciprocate forward and rearward. The drive shaft sleeve 7 and the spool shaft 8 extend out forward of the body front portion 12. The spool shaft 8 is disposed below a handle shaft 5. A pinion gear 7*a* is formed at the rear portion of the drive shaft sleeve 7. The rear portion of the spool shaft 8 extends out rearward beyond a rear end of the pinion gear 7*a* (the drive shaft sleeve 7).

The spool reciprocation device 70 is provided with a guide shaft 71 extending in the front-rear direction, a slider 72 having a guide groove 73 formed on a right side surface thereof and configured to move along the guide shaft 71, and an interlocking gear 74 (a constituent member) having an eccentric protrusion 75 formed thereon, the eccentric protrusion 75 being engaged with the guide groove 73. A coupling portion 8*a* (see FIG. 4) protruding rearward and coupled to the slider 72 is provided at a rear end of the spool shaft 8, and thus the spool shaft 8 and the slider 72 are integrated into one unit.

As shown in FIG. 4, the handle shaft 5 extending in a left-right direction is provided in the body 10. The handle shaft 5 is rotatably supported to the lid member 30 and the body 10 via left and right bearings 5*a* and 5*b*. To the handle shaft 5, a drive gear 6 and a shaft sleeve (a gear) 6*a* are secured as functional members. A handle 5*d* (see FIG. 1) is mounted to a left end portion of the handle shaft 5 via a coupling shaft 5*c*.

The drive gear 6 is secured to a left side of the handle shaft 5 and meshed with the pinion gear 7*a* on a front side of the handle shaft 5. The shaft sleeve 6*a* is secured to a right side of the handle shaft 5 and meshed with the interlocking gear 74 on a rear side of the handle shaft 5. Thus, upon a winding operation by the handle 5*d*, a driving force generated by the winding operation is transmitted to the drive shaft sleeve 7 via the handle shaft 5, the drive gear 6, and the pinion gear 7*a*, causing the rotor 2 to rotate together with the drive shaft sleeve 7. Furthermore, concurrently therewith, the spool 3 is caused to reciprocate forward and rearward via the spool shaft 8 and the spool reciprocation device 70. Thus, a fishing line is evenly wound around a line-winding shell 3*a* (see FIG. 1) of the spool 3 via an unshown fishing line guide of the rotor 2 (see FIG. 1).

Figure 5A:
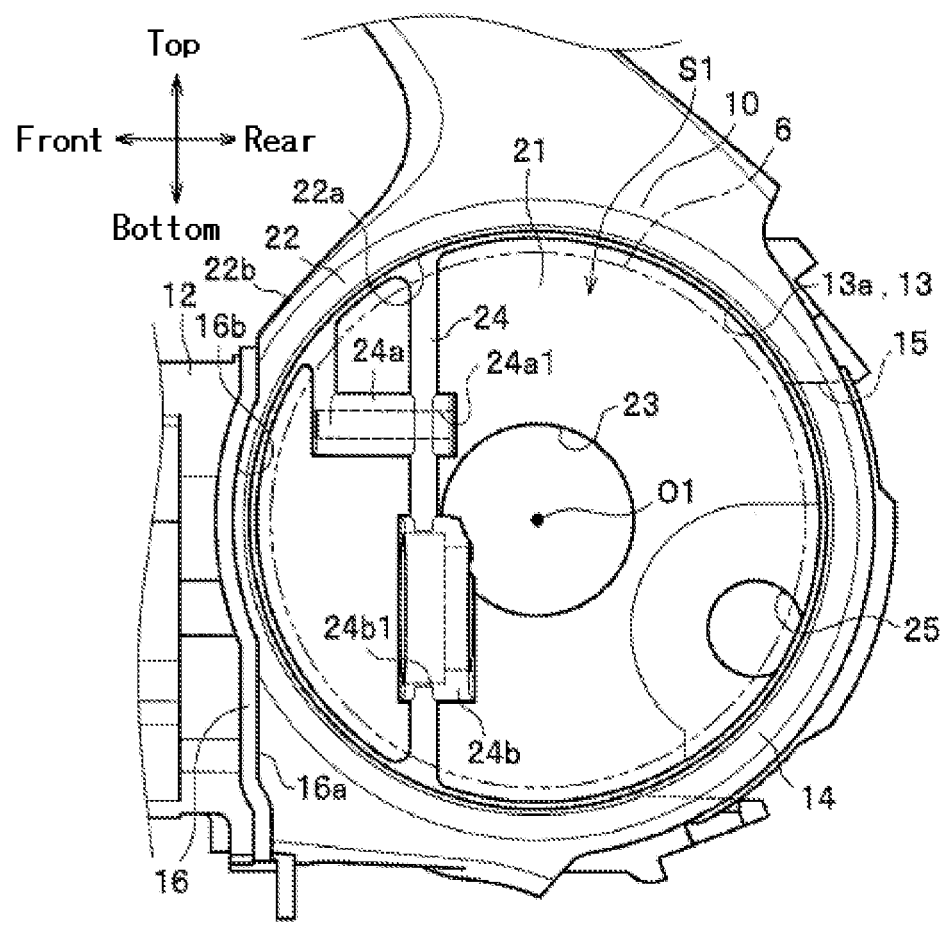
FIG. 5*a* is a side view showing a structure inside a side opening portion.

Next, a detailed description is given of configurations of the various portions. As shown in FIG. 5*a*, the body 10 has a bottomed box shape (a tubular shape) having a bottom portion with a peripheral wall and is open toward a left side. The body 10 is provided with a disc-shaped right wall portion 21 and a tube portion 22 in the shape of a tube extending leftward from a peripheral end edge of the right wall portion 21. A left end portion of the tube portion 22 constitutes the side opening portion 13.

An inner surface (a left side surface) of the right wall portion 21 has a right side central hole 23, a support rib 24 formed thereon, and an insertion hole 25. The right side central hole 23 (which functions as a support portion) is a hole through which a right end portion of the handle shaft 5 penetrates and is provided at a central portion of the right wall portion 21. A right bearing 5*b* (see FIG. 4) as a handle shaft bearing rotatably supporting the handle shaft 5 is mounted in the right side central hole 23. With respect to the right side central hole 23, the right bearing 5*b* is mounted from a right lateral side of the body 10.

The support rib 24 is provided in a protruding manner so as to be integral with the right wall portion 21 and disposed inside the housing space S1. The support rib 24 is positioned forward beyond the right side central hole 23 and extends in a top-bottom direction. Upper end portions 24*c* and 24*d* and a lower end portion 24*e* of the support rib 24 are connected to the inner peripheral surface 22*a* of the tube portion 22 so as to be integral therewith. With the support rib 24 provided, strength of the right wall portion 21 (the reel unit) and the tube portion 22 (the reel unit) is improved. The support rib 24 has a tubular upper support portion 24*a* and a tubular lower support portion 24*b* provided so as to be integral therewith. The upper support portion 24*a* has a guide shaft support hole 24*a*1 supporting a front end portion of the guide shaft 71 (see FIG. 3).

As shown in FIG. 4, a rear bearing (a ball bearing) 51 is supported to the lower support portion 24*b* via a collar 51*a*. That is, a rear portion side of the pinion gear 7*a* (the rear portion of the drive shaft sleeve 7) is supported to the body 10 via the rear bearing 51 and the support rib 24. The rear portion of the spool shaft 8 penetrates through to rearward of the lower support portion 24*b* via the collar 51*a*.

The spool shaft 8 is not in contact with an inner periphery of the pinion gear 7*a*, with a minute gap provided therebetween. In FIG. 4, the spool shaft 8 is supported so as to be slidable in the front-rear direction by the collar 51*a* and an unshown support portion in the body 10, the collar 51*a* being supported to the lower support portion 24*b*, the unshown support portion being formed on the inner periphery of the pinion gear 7*a* on a front portion side thereof.

The upper support portion 24*a* and the lower support portion 24*b* are positioned inside the side opening portion 13. Further, as shown in FIG. 3, the lower support portion 24*b* is disposed so as to overlap with at least part of the right bearing 5*b* as viewed from an axial direction of the handle shaft 5. A configuration may also be adopted in which the rear bearing 51 is disposed so as to overlap with at least part of the right bearing 5*b* as viewed from the axial direction of the handle shaft 5.

As shown in FIG. 5*a*, the insertion hole 25 is formed rearward beyond the right side central hole 23. Further, as shown in FIG. 4, a boss portion 27 of a support member 26 penetrates through the insertion hole 25. Thus, the boss portion 27 freely rotatably supporting the interlocking gear 74 is disposed at a rear portion in the body 10. The support member 26 is provided on an outer side (a right side) of the right wall portion 21.

As shown in FIG. 5*a*, the tube portion 22 has a substantially cylindrical shape about a center axis O1 of the handle shaft 5. Specifically, the inner peripheral surface 22*a* of the tube portion 22 is formed in a circular shape about the center axis O1 of the handle shaft 5 and corresponds to a size of the drive gear 6. That is, the inner peripheral surface 22*a* is a surface concentric with an outer peripheral surface of the handle shaft 5.

An outer peripheral surface 22*b* of the tube portion 22 is formed in a substantially circular shape about the center axis O1 of the handle shaft 5, and the tube portion 22 has a thickness (a thickness in a radial direction) substantially uniform in a circumferential direction. For this reason, the tube portion 22 is reduced more in size than a conventional tube portion (a tube portion having a rectangular tube shape in side view), and formation of an unnecessary space is prevented between the inner peripheral surface 22*a* of the tube portion 22 and the drive gear 6.

An inner peripheral surface 13*a* of a left end portion of the tube portion 22 (the side opening portion 13) is formed to have a diameter substantially equal to that of the inner peripheral surface 22*a* of the tube portion 22 so that even the drive gear 6 of a relatively large size can be easily installed in the tube portion 22. Thus, as shown in FIG. 3 and FIG. 4, an inner diameter of the side opening portion 13 (the inner peripheral surface 13*a*) is formed so as to be larger than an outer diameter of the drive gear 6 (shown by a chain double-dashed line). In order words, the drive gear 6 is formed to have a large diameter as approximate as possible to an inner diameter of the side opening portion 13. The handle shaft 5, the drive gear 6, and the shaft sleeve 6*a* are inserted into the housing space S1 via the side opening portion 13 so as to be installed in the body 10.

Figure 6A:
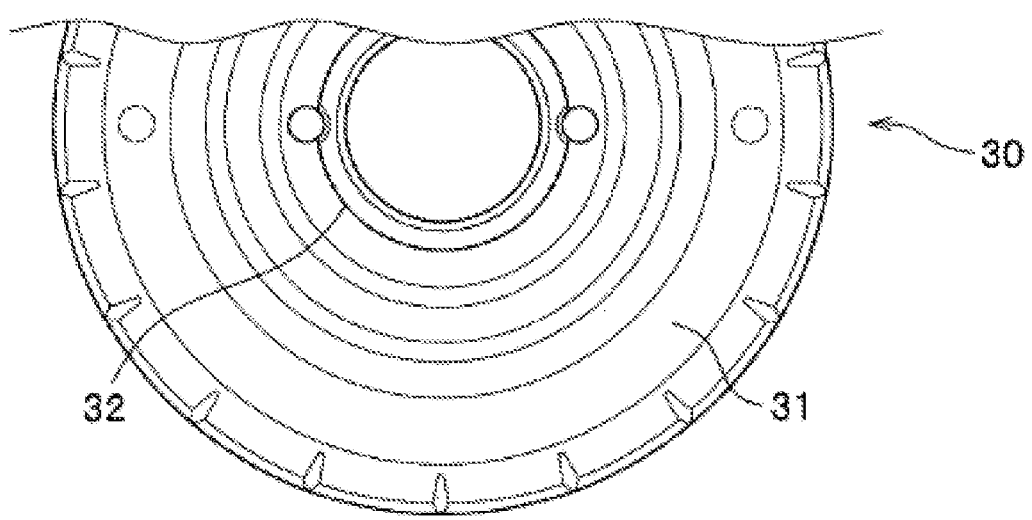
FIG. 6*a* is an enlarged side view showing part of the lid member.
Figure 6B:
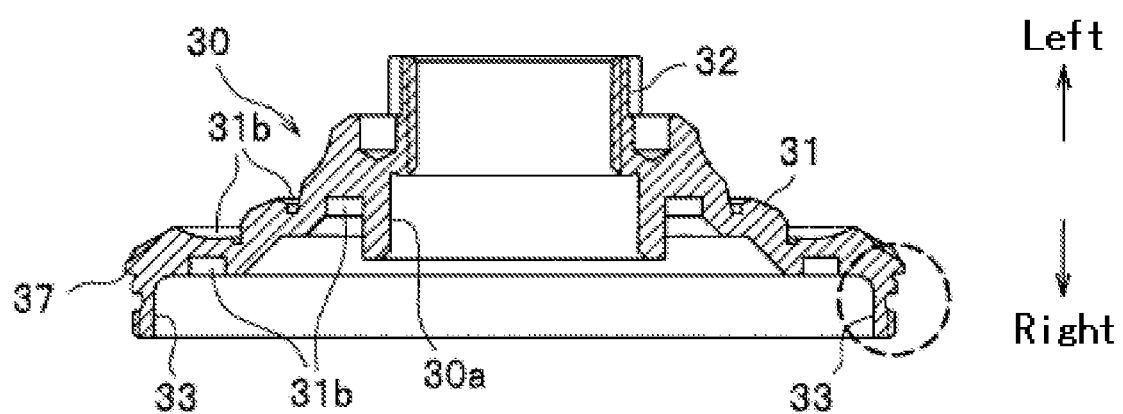
FIG. 6*b* is a cross-sectional view of the lid member.
Figure 6C:
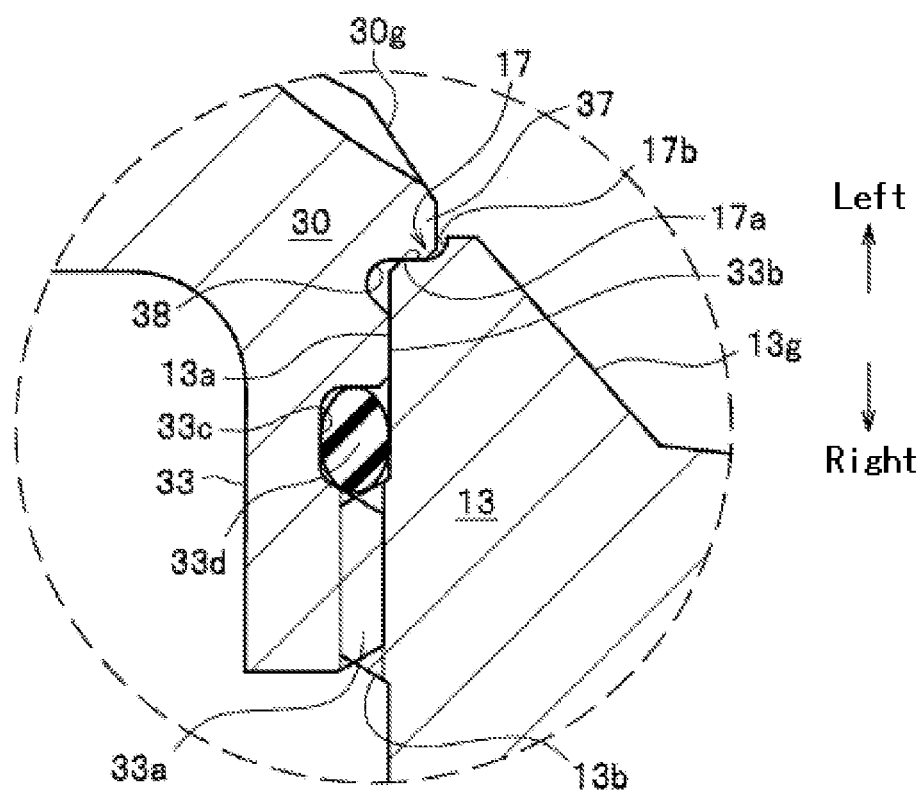
FIG. 6*c* is an enlarged sectional view showing a fastened state between the side opening portion of the body and a peripheral edge portion of the lid member.

As shown in FIG. 6*c*, a female screw 13*b* is formed on a depth side of the inner peripheral surface 13*a* of the side opening portion 13. A fitting receiving portion 17 having a concave shape in cross section is formed on an opening peripheral edge portion of the side opening portion 13 over a circumferential direction. The fitting receiving portion 17 includes a bottom surface portion 17a and a rising portion 17b rising in a round shape in cross section from the bottom surface portion 17a.

Figure 5B:
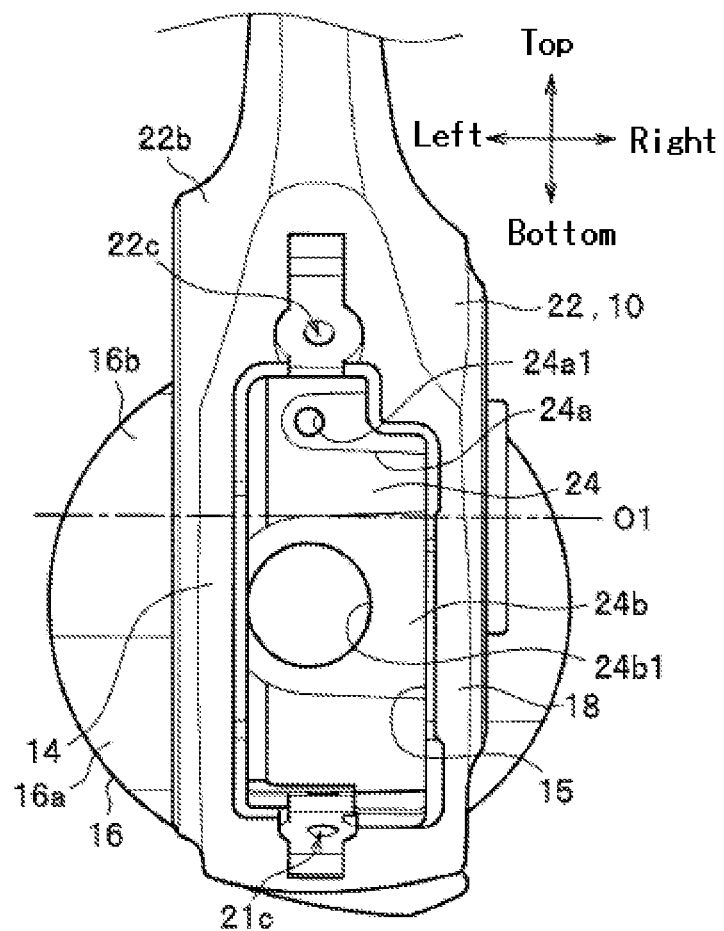
FIG. 5*b* is a rear view of a body from which a protective cover has been removed.

In a rear portion of the tube portion 22, as shown in FIG. 5b, there are formed two protective cover female screw holes 22c (see FIG. 7a) formed through the outer peripheral surface 22b of the tube portion 22 and a rear opening portion 15 penetrating through the rear portion of the tube portion 22.

The rear opening portion 15 communicates with the housing space S1. The rear opening portion 15 is an opening portion for receiving part of a component installed in the body 10 and disposing the component outside the body 10, in other words, so that the component protrudes rearward from the body 10. The rear opening portion 15 penetrates through the tube portion 22 only at a central portion in the left-right direction, so that an opening (hole) of the rear opening portion 15 and an opening (hole) of the side opening portion 13 are not continuous with each other. Thus, an arc-shaped bridge portion 14 extends between the side opening portion 13 and the rear opening portion 15, the bridge portion 14 constituting an opening end edge of each of the side opening portion 13 and the rear opening portion 15. Accordingly, compared with a case where the opening (hole) of the rear opening portion 15 and the opening (hole) of the side opening portion 13 are continuous with each other, strength of the tube portion 22 is improved.

As shown in FIG. 3, part of the interlocking gear 74 of the spool reciprocation device 70, part of the slider 72 when positioned at a rearmost end position of a stroke, and a rear end portion 71a of the guide shaft 71 protrude rearward from the rear portion of the body 10 via the rear opening portion 15. That is, the rear opening portion 15 has such a size and shape that these members are disposed by being inserted therethrough. These members protrude rearward of the body 10 through the rear opening portion 15, resulting in the housing space S1 being formed in a compact size.

As shown in FIG. 5b, a cover attachment portion 18 is formed around the rear opening portion 15. The protective cover 40 is attached to the cover attachment portion 18 via the seal member 50 (see FIG. 7a). The protective cover 40 is fastened by a bolt 40c screwed with each of the protective cover female screw holes 22c and thus is secured so as to cover the rear opening portion 15 of the body 10 (the tube portion 22). With the protective cover 40 mounted, as shown in FIG. 4, a space portion S2 is formed on an inner side of the protective cover 40. The part of the interlocking gear 74 and the part of the slider 72 protruding from the rear portion of the body 10 through the rear opening portion 15 are housed in the space portion S2. That is, the part of the interlocking gear 74 and the part of the slider 72 are covered with the protective cover 40 attached via the seal member 50 and thus are housed in a liquid-tight manner (see FIG. 3).

Figure 7A:
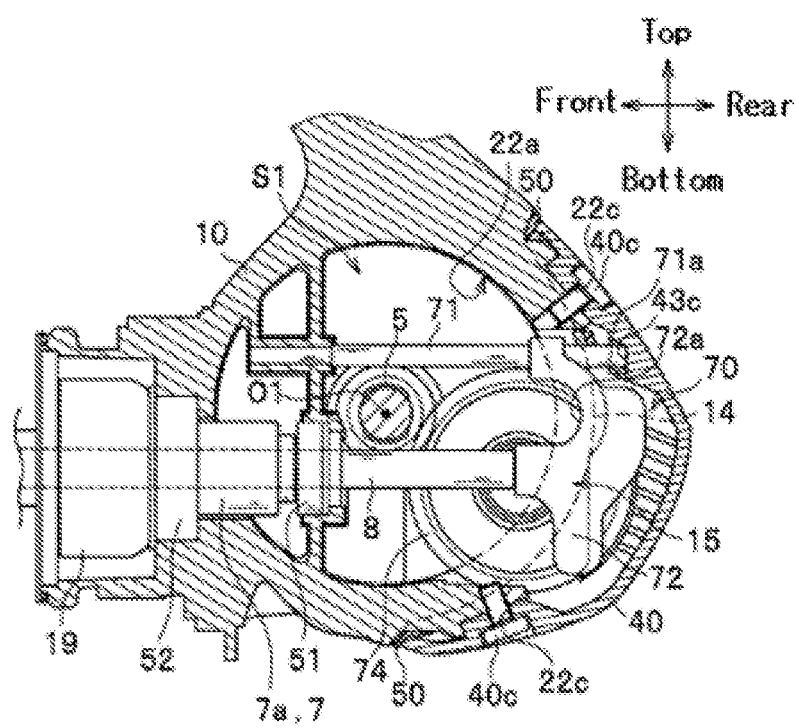
FIG. 7*a* is a longitudinal sectional view of the reel unit in a case where a slider is at a rearmost end position of a stroke.

Furthermore, as shown in FIG. 3 and FIG. 7a, the rear end portion 71a of the guide shaft 71 protruding from the rear portion of the body 10 is supported to a support portion 43c provided on the inner side of the protective cover 40. The rear opening portion 15 functions also as an installation hole for installing the spool shaft 8 and the various members of the spool reciprocation device 70.

As shown in FIG. 2 and FIG. 3, the bridge portion 14 has an arc shape extending from an upper portion to a lower portion of the body 10 along the side opening portion 13 (the lid member 30). The bridge portion 14 is formed so as to have an outer shape concentric with the side opening portion 13 (the lid member 30). As shown in FIG. 3, the bridge portion 14 constitutes part of an opening edge portion of the side opening portion 13. While the bridge portion 14 formed so as to be concentric with the side opening portion 13 is shown here, there is no limitation thereto, and the bridge portion 14 may be of a type that is eccentric forward or rearward with respect to a center of the side opening portion 13 (a center of the handle shaft 5). Furthermore, the bridge portion 14 may include a portion whose outer shape is linear in side view.

Next, a description is given of a detail of a principal configuration of the spool reciprocation device 70. As shown in FIG. 7a, the interlocking gear 74 is installed in the body 10 from an outer rear side so as to penetrate through the rear opening portion 15. In a state where the interlocking gear 74 is thus installed, part (a rear region) of the interlocking gear 74 protrudes rearward from the rear opening portion 15 and is housed in the protective cover 40. As a conversion drive member that converts rotation of the handle shaft 5 into forward-rearward reciprocation of the spool shaft 8, the interlocking gear 74 cooperates with the slider 72 via the eccentric protrusion 75.

With respect to the handle shaft 5, the guide shaft 71 is disposed on an upper side of the handle shaft 5 opposite to a side on which the spool shaft 8 is disposed. The rear end portion 71a of the guide shaft 71 penetrates through the rear opening portion 15. The rear end portion 71a of the guide shaft 71 is engaged with the support portion 43c in the protective cover 40. Because of this, as shown in FIG. 7a, when the slider 72 has moved rearward, part thereof extends into the protective cover 4, and thus a movement range of the slider 72 is effectively ensured.

Figure 7B:
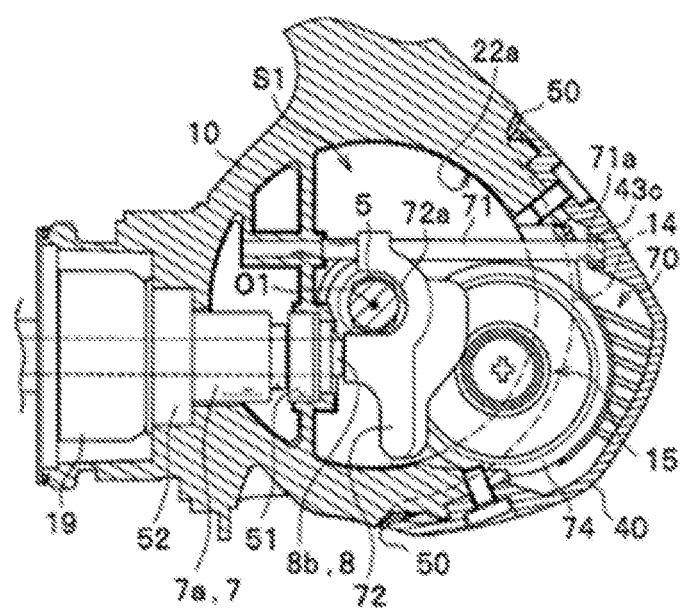
FIG. 7*b* is a longitudinal sectional view of the reel unit in a case where the slider is at a foremost end position of the stroke.

Furthermore, a concave portion 72a concaved toward a rear side is formed on a front surface of the slider 72 (a surface thereof opposed to the handle shaft 5). Because of this, as shown in FIG. 7b, when the slider 72 has moved forward, the handle shaft 5 is received in the concave portion 72a, and thus the movement range of the slider 72 is extended forward. As described above, the movement range (a stroke) of the slider 72 is effectively ensured, while a size increase of the body 10 is prevented.

Next, a detailed description is given of the lid member 30. As shown in FIG. 2, the lid member 30 is mounted to the side opening portion 13 and acts to close the side opening portion 13 in a liquid-tight manner and to support a left end side of the handle shaft 5. As shown in FIG. 6b, the lid member 30 has a chevron shape in cross section and includes a peripheral wall portion 31, a cylindrical portion 32 provided at a central portion of the peripheral wall portion 31 so as to be integral therewith, and a cylindrical insertion portion 33 provided on an outer peripheral edge portion of the peripheral wall portion 31. The handle shaft 5 is supported at a center portion of the lid member 30 (see FIG. 4).

A recess portion 31b is formed on an outer side surface (a left side surface) and an inner peripheral surface (a right side surface) of the peripheral wall portion 31. This achieves a weight reduction of the lid member 30. The cylindrical portion 32 has, on its right side, namely, a depth side, a diameter increased stepwise, and the bearing 5a (see FIG. 4) is housed in a portion 30a having this increased diameter. The lid member 30 supports the left end side of the handle shaft 5 via the bearing 5a.

The insertion portion 33 extends toward the side opening portion 13 and is a section inserted into the side opening portion 13. As shown in FIG. 6c, a male screw 33a is formed on an outer peripheral portion of a distal end (a right end) of the insertion portion 33. The male screw 33a can be screwed into the female screw 13b of the side opening portion 13. Thus, the lid member 30 itself can be firmly fastened to the side opening portion 13 by being screwed thereinto, and thus the lid member 30 can be installed with ease.

A cylindrical contact surface (contact portion) 33b is formed on an outer peripheral portion of the insertion portion 33 on a side proximal beyond the male screw 33a, the contact surface (the contact portion) 33b coming in contact with the inner peripheral surface 13a of the side opening portion 13. When the lid member 30 is mounted to the side opening portion 13 by being screwed thereinto, the contact surface 33b performs aligning by coming in contact with the inner peripheral surface 13a of the side opening portion 13 in the circumferential direction. Thus, concentricity between the side opening portion 13 and the lid member 30 can be obtained. Accordingly, even without increasing processing accuracy, formation of a gap between the side opening portion 13 and the lid member 30 is suppressed. Furthermore, a center of the lid member 30 agrees with a center of the body 10. This prevents the handle shaft 5 from tilting, thus stabilizing and improving rotation operability of the handle 5d and meshing performance. The contact surface 33b may be configured to partially come in contact with the inner peripheral surface 13a of the side opening portion 13 at intervals in the circumferential direction.

On an outer peripheral surface of the insertion portion 33, a housing concave portion 33c is formed between the male screw portion 33a and the contact surface 33b. As a seal member, an O-ring 33d is fitted around the housing concave portion 33c.

A flange-shaped fitting portion 37 is formed on an outer peripheral edge portion of the lid member 30, the fitting portion 37 extending outward in a circumferential direction. In a state where a slight gap is provided between the fitting portion 37 and the rising portion 17b of the fitting receiving portion 17 of the side opening portion 13 (while the figure shows such a gap, contact fitting can also be adopted), the fitting portion 37 comes in contact with the bottom surface portion 17a and is fitted to the fitting receiving portion 17 by spigot fitting. An amount of protrusion of the fitting portion 37 to a lateral side is reduced by such spigot fitting. Thus, even in a case where a fishing line is disengaged during a reel operation, the disengaged fishing line is unlikely to be caught by the outer peripheral edge portion of the lid member 30. Furthermore, entry of dust and water can be prevented by spigot fitting. Thus, it is possible to block entry of, for example, sea water, water, or sand or foreign matter mixed therein. That is, such a spigot fitting portion realizes prevention of entry of a fishing line, sea water, foreign matter, or the like.

As shown in FIG. 5c, an outer surface 30g of the outer peripheral edge portion of the lid member 30 and an outer surface 13g of an outer peripheral edge portion of the side opening portion 13 form a substantially continuous slant surface with the fitting portion 37 (the fitting receiving portion 17) interposed therebetween. This provides a configuration in which a disengaged fishing line is unlikely to be caught.

As shown in FIG. 5c, a small diameter portion 38 having a curved concave shape in cross section is formed between the fitting portion 37 and the contact surface 33b. A lubricant such as grease or oil is applied to the small diameter portion 38. With such a lubricant applied, smooth mounting of the lid member 30 is enabled, and a sealing property with respect to the inner peripheral surface 13a of the side opening portion 13 is enhanced. Similarly, a lubricant such as grease or oil may be applied also to the fitting receiving portion 17 and the fitting portion 37.

Next, a detailed description is given of a boundary portion between the body 10 and the body front portion 12 and of the body front portion 12. The body front portion 12 is provided at the front portion of the body 10 so as to be integral therewith. As shown in FIG. 2 and FIG. 3, a flange portion 16 having a thin plate shape is provided at a boundary portion between the body 10 and the body front portion 12. As shown in FIG. 2, a concave-shaped portion 16b is formed at a left side portion of the flange portion 16. The concave-shaped portion 16b is provided so as to be concaved forward along the shape of a front end portion 30e of the lid member 30. With the concave-shaped portion 16b provided, the front end portion 30e of the lid member 30 is positioned so as to extend forward beyond an upper rear surface 16a of the flange portion 16. Furthermore, as shown in FIG. 1, in a positional relationship with the rotor 2, the front end portion 30e of the lid member 30 is positioned forward beyond a rearmost end portion 2a of the rotor 2. Moreover, as shown in FIG. 2, in a positional relationship with a bottomed cylindrical cover 12a covering the body front portion 12, the front end portion 30e of the lid member 30 is positioned forward beyond a rear end portion 12b of the cover 12a. Since the front end portion 30e of the lid member 30 is positioned in such a positional relationship, the lid member 30 can be increased in diameter, while the body 10 can be made compact in the front-rear direction. The concave-shaped portion 16b serves as a clearance used to mount the lid member 30.

As shown in FIG. 2 and FIG. 3, on an inner side of the body front portion 12, there is disposed a front bearing (a ball bearing) 52 supporting the front portion side of the pinion gear 7a (see FIG. 4)(a front portion of the drive shaft sleeve 7). As shown in FIG. 4, the front bearing 52 is supported by a support portion 53 provided forward of the flange portion 16 so as to be integral therewith. That is, the pinion gear 7a is rotatably supported to the reel unit 1 via the front bearing 52 and the rear bearing 51 (the ball bearing). While the above has described that the front bearing 52 supports the front portion side of the pinion gear 7a (see FIG. 4) (over the pinion gear 7a and the drive shaft sleeve 7), the front bearing 52 may be configured to support only a front portion of the pinion gear 7a or support only the front portion of the drive shaft sleeve 7. The same applies also to the rear bearing 51, i.e. the rear bearing 51 may be configured to support only a rear portion of the pinion gear 7a or provide support over a rear portion of the pinion gear 7a and the rear portion of the drive shaft sleeve 7.

The drive shaft sleeve 7 extends out toward the spool 3 (see FIG. 1), and a rotor 4 is mounted to a distal end portion of the drive shaft sleeve 7 by use of a rotor nut 2n (partly shown). A rear end of an outer ring of the front bearing 52 is held in such a manner as to abut against a concave 54 formed in the support portion 53 of the reel unit 1. A rear end of an inner ring of the front bearing 52 is held in such a manner as to abut against a front end of the pinion gear 7a. The outer ring of the front bearing 52 is prevented at its front end from coming off by a latch plate 12e latched to the body front portion 12. A front end of the inner ring of the front bearing 52 is brought in contact with an inner ring of a roller-type one-way clutch 19 (hereinafter, referred to simply as a "one-way clutch").

The one-way clutch 19 works as a known anti-reverse rotation mechanism (stopper) to prevent reverse rotation of the handle 5*d* (the rotor 2) in a fishing line releasing direction. The one-way clutch 19 is interlocked with a switching member 10*g* (see FIG. 2) provided at a lower portion of the body 10 and configured to be switchable between an operating state and a non-operating state by pivotally operating the switching member 10*g*. In this case, rotation in a reverse rotation direction (rotation in the fishing line releasing direction) of the handle 5*d* (the rotor 4) is prevented by switching the switching member 10*g* to the operating state. The one-way clutch 19 described above is covered with a peripheral wall portion 12*f* of the body front portion 12 and protected on its outer side by the cover 12*a*. A front end of an inner ring 19*a* of the one-way clutch 19 is secured to a cylindrical portion 2*b* of the rotor 2 via a magnetic member 2*c*. A known type of magnetic seal mechanism 80 is used to provide sealing between the magnetic member 2*c* and a front end portion of the peripheral wall portion 12*f*.

As described above, the pinion gear 7*a* is rotatably supported to the reel unit 1 by two front and rear bearings, which are the front bearing 52 and the rear bearing 51. Further, as shown in FIG. 4, a position R1 on a lateral side of the pinion gear 7*a* where the side opening portion 13 and the lid member 30 are screwed with each other is between a position R2 where the pinion gear 7*a* (the drive shaft sleeve 7) is supported by the front bearing 52 and a position R3 where the drive gear 6 is meshed with the pinion gear 7*a*. Here, as shown in FIG. 3, the screwing position R1 refers to a position where the side opening portion 13 and a center O2 of the spool shaft 8 overlaps with each other as viewed from the axial direction of the handle shaft 5. The supporting position R2 is a position defined with reference to a center position of the front bearing 52 in an axial direction thereof. Furthermore, in FIG. 4, the meshing position R3 is a position defined with reference to a center position of a tooth portion of the drive gear 6 in a width direction thereof.

According to the foregoing embodiment, with respect to the side opening portion 13 provided at the side portion of the body 10, the circular lid member 30 is firmly screwed thereinto with a fastening force uniform in the circumferential direction, and thus sufficient strength in mounting the lid member 30 can be ensured. Since sufficient strength in mounting the lid member 30 can be ensured, accuracy in supporting the handle shaft 5 and, therefore, accuracy in supporting the drive gear 6 meshed with the pinion gear 7*a* are improved and maintained. Furthermore, the circular lid member 30 is mounted by being screwed, so that the side opening portion 13 of the body 10 is reinforced, and strength of the body 10 itself is also improved. Thus, it also becomes possible to adopt a large-diameter drive gear as the drive gear 6. Furthermore, the need for a plurality of screws or the like for securing the lid member 30 to the body 10 can be eliminated, so that the number of components required can be reduced, and incorporation workability and dismantling workability are improved. Furthermore, breakage of screws can also be prevented.

Moreover, the lid member 30 and the side opening portion 13 are circular in shape, and thus a load exerted from the lid member 30 on the side opening portion 13 (for example, a load generated during a handle operation) is dispersed uniformly over an entire circumference of the side opening portion 13. For this reason, a load (stress) is hardly concentrated on one part of the body 10 (the side opening portion 13), and thus excellent durability of the body 10 is obtained.

Meanwhile, with the front bearing 52 and the rear bearing 51 provided, accuracy in supporting the pinion gear 7*a* can be increased. Thus, accuracy in meshing (a meshed state) between the pinion gear 7*a* and the drive gear 6 is maintained to be high, and thus improved rotational performance, maintained gear strength, and moreover, improved durability can be achieved. Furthermore, the body 10 itself (particularly around the side opening portion 13) is improved in strength and durability by mounting the lid member 30 thereto, and thus accuracy in supporting the pinion gear 7*a* by using the front bearing 52 and the rear bearing 51 is further improved.

Furthermore, with the handle shaft 5 supported at the center portion of the lid member 30, concentricity between the lid member 30 and the handle shaft 5 can be achieved, and thus accuracy in supporting the handle shaft 5 and, therefore, accuracy in supporting the drive gear 6 are increased.

Furthermore, at least one of the front bearing 52 and the rear bearing 51 is provided in the body 10, and thus at least one of the front portion and the rear portion of the pinion gear 7*a* is supported to the body 10 via a bearing, so that accuracy in supporting the pinion gear 7*a* is increased.

Furthermore, the rear bearing 51 is positioned inside the side opening portion 13 (inside the housing space S1), and thus the rear bearing 51 can be installed through the side opening portion 13, so that excellent installability is obtained.

Furthermore, the right side central hole 23 supporting the handle shaft 5 is provided in the body 10, and the rear bearing 51 overlaps with at least part of the right bearing 5*b* disposed in the right side central hole 23 as viewed from the axial direction of the handle shaft 5, and thus space saving in the body 10 (in the side opening portion 13) can be achieved. Furthermore, it is also possible to attach the right bearing 5*b* from an external side of the body 10.

Furthermore, the position R1 where the side opening portion 13 and the lid member 30 are screwed with each other is arranged at a position in a vicinity of the front bearing 52, and thus with the lid member 30 secured by being screwed, reinforcement around the front bearing 52 can be achieved. Particularly in a case where the side opening portion 13 is increased in diameter and a large-diameter drive gear is used as the drive gear 6, the side opening portion 13 is positioned on a lateral side of the front bearing 52, so that a thickness of a region around the front bearing 52 might be relatively reduced. However, with the lid member 30 secured by being screwed, reinforcement around the front bearing 52 can be achieved. Accordingly, it is possible to reinforce a support structure of the front bearing 52 and thus to improve rotational performance of the pinion gear 7*a* and durability thereof. Meanwhile, the position R1 where the side opening portion 13 and the lid member 30 are screwed with each other is arranged at a position in a vicinity of the position R3 where the drive gear 6 is meshed with the pinion gear 7*a*, and thus a load inputted at the meshing position R3 from the drive gear 6 to the pinion gear 7*a* can be favorably received by the front bearing 52 and a securing structure of the lid member 30 situated lateral to the front bearing 52. Accordingly, it is possible to improve rotational performance of the pinion gear 7*a* and durability thereof.

Furthermore, the contact surface 33*b* for obtaining concentricity with the side opening portion 13 is formed in the lid member 30, and thus the center of the side opening portion 13 agrees with the center of the lid member 30. This prevents the handle shaft 5 from tilting, thus stabilizing and improving rotation operability of the handle 5*d* and meshing performance of the drive gear 6.

Furthermore, since the rear opening portion 15 is provided, a constituent member of a desired size can be used without being limited by a size of a space in the reel unit 1, and thus the degree of design freedom is increased. Furthermore, at least part of the constituent member can be disposed on a rear side in a rear portion of the reel unit 1, and thus a size reduction of the reel unit 1 can be achieved. Furthermore, a forward-rearward stroke of the spool reciprocation device 70 can be favorably ensured by effectively utilizing a space on the rear side in the rear portion of the reel unit 1. Furthermore, with the bridge portion bridge portion 14 provided, strength of the rear portion of the body 10 can be ensured, and thus operation performance of the spool reciprocation device 70 and, therefore, quality of a winding operation can be improved.

Furthermore, with respect to the handle shaft 5, the guide shaft 71 of the spool reciprocation device 70 and the spool shaft 8 can be disposed in upper and lower inside spaces, respectively, so that they are separated in a balanced manner, and thus it is possible to ensure a sufficient forward-rearward stroke of the spool 3 while achieving a size reduction of the reel unit 1. Furthermore, the drive gear 6 having an outer diameter of a shape similar to that of the circular side opening portion 13 can be housed, and thus the drive gear 6 can be increased in diameter as much as possible, while a size reduction of the reel unit 1 can be achieved. Accordingly, it becomes possible to maintain a high-speed gear ratio and strength.

Figure 8:
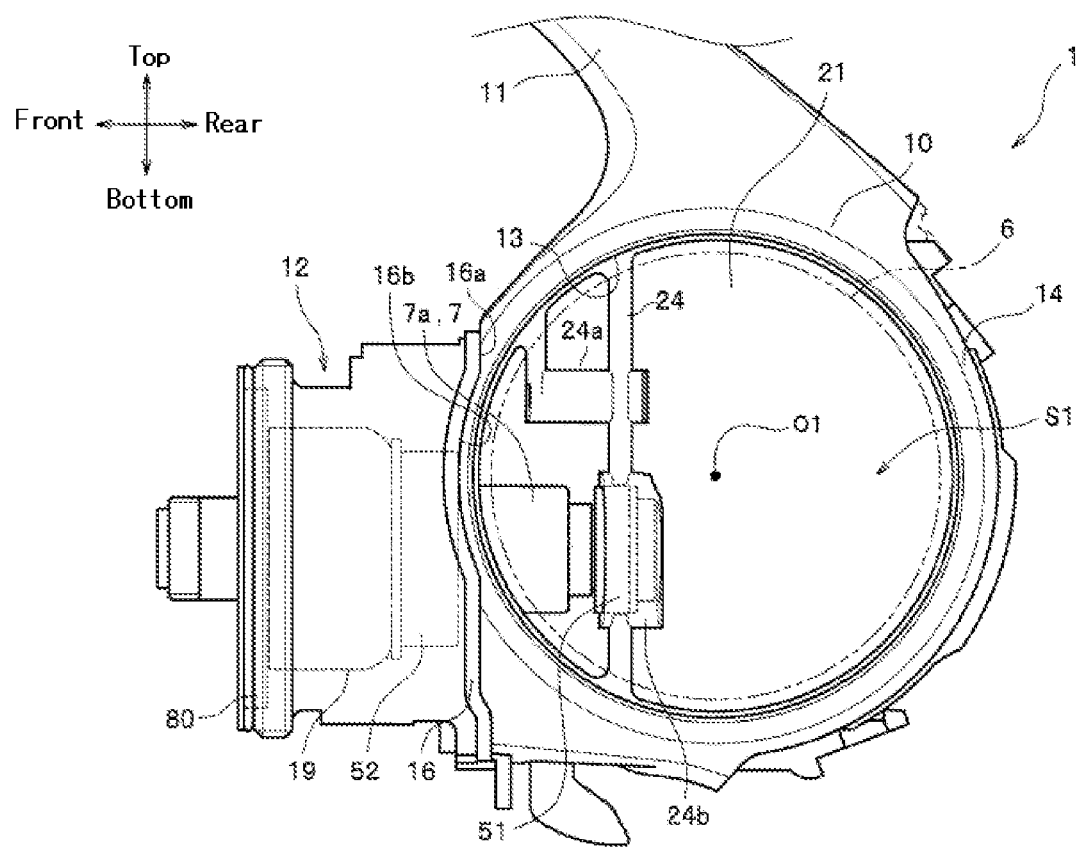
FIG. 8 is a side view showing a body as a modification example.

While the foregoing has described the embodiments of the present invention, the present invention is not limited thereto and is susceptible to various modifications. For example, the handle shaft 5 is only required to be cantilever-supported at least near the lid member 30 and not necessarily required to be supported to the right wall portion 21 of the body 10. In this case, as shown in FIG. 8, the handle shaft 5 can be eliminated from inside the housing space S1, and thus the housing space S1 is accordingly widened, so that arrangements of constituent members in the housing space S1 are improved. This improves the degree of design freedom of the fishing spinning reel.

Furthermore, the handle shaft 5 is not limited to being supported to the center portion of the lid member 30 and may be configured to be supported at a position displaced from the center portion.

Furthermore, a configuration may be adopted in which the front bearing 52 is positioned inside the side opening portion. This can achieve a further size reduction of the body 10.

Furthermore, the foregoing embodiment has described a case of using the spool reciprocation device 70 in which the slider 72 coupled and secured to the coupling portion 8a at the rear portion of the spool shaft 8 is engaged with the eccentric protrusion 75 of the interlocking gear 74 (the constituent member) that rotates in such a manner as to be interlocked with the handle shaft 5 so that rotation of the handle shaft 5 is converted into forward-rearward reciprocation of the spool shaft 8. There is, however, no limitation thereto, and the present invention may be implemented by using a spool reciprocation device in which the slider 72 is engaged with a known screw shaft (a constituent member) that rotates in such a manner as to be interlocked with the drive shaft sleeve 7 having the pinion gear 7a.

LIST OF REFERENCE NUMBERS 1 reel unit
5 handle shaft
6 drive gear
7 rotary shaft sleeve
7a pinion gear
8 spool shaft
10 body
13 side opening portion
13b female screw (female screw portion)
15 rear opening portion
23 right side central hole (support portion)
5b bearing (handle shaft bearing)
24 support rib (support member)
30 lid member
33 male screw (male screw portion)
33b contact surface (contact portion)
51 front bearing
52 rear bearing
70 spool reciprocation device
71 guide shaft
72 slider
72a concave portion
R1 screwing position
R2 supporting position
R3 meshing position
S1 housing space

What is claimed is:

1. A fishing spinning reel comprising:
   a reel unit including a body and a lid member closing a side opening portion provided at a side portion of the body,
   wherein a handle shaft is supported by at least the lid member,
   the side opening portion and the lid member are circular in shape,
   the fishing spinning reel further comprising:
   a female screw portion provided on an inner peripheral portion of the side opening portion;
   a male screw portion provided on an outer peripheral portion of the lid member and screwed into the female screw portion such that the lid member is directly fastened to the side opening portion;
   a drive gear rotationally driven via the handle shaft;
   a pinion gear meshed with the drive gear;
   a front bearing rotatably supporting a front portion side of the pinion gear; and
   a rear bearing rotatably supporting a rear portion side of the pinion gear.

2. The fishing spinning reel according to claim 1, wherein the handle shaft is supported at a center portion of the lid member.

3. The fishing spinning reel according to claim 1, wherein the rear bearing is positioned inside the side opening portion.

4. The fishing spinning reel according to claim 1, wherein a support portion supporting the handle shaft is provided in the body,
   a handle shaft bearing supporting the handle shaft is disposed in the support portion, and
   the rear bearing or a support member supporting the rear bearing overlaps with at least part of the handle shaft bearing as viewed from an axial direction of the handle shaft.

5. The fishing spinning reel according to claim 1, wherein a position where the side opening portion and the lid member are screwed with each other is situated lateral to the pinion gear and between a position where the pinion gear is supported by the front bearing and a position where the drive gear is meshed with the pinion gear.

6. The fishing spinning reel according to claim 1, wherein in the lid member, there is formed a contact portion for obtaining concentricity with the side opening portion by coming in contact with an inner peripheral surface of the side opening portion.

7. The fishing spinning reel according to claim 1, a spool reciprocation device is housed and supported inside the side opening portion, at a rear portion of the body, there is formed a rear opening portion for receiving at least part of a constituent member of the spool reciprocation device so that the constituent member is disposed on a rear side, and the body includes a bridge portion extending between the side opening portion and the rear opening portion and forming an opening end edge of each of the side opening portion and the rear opening portion.

8. The fishing spinning reel according to claim 7, wherein there is provided a spool shaft supported to the body so as to be freely slidable forward and rearward, a rear portion of the spool shaft being positioned in the body, the spool reciprocation device includes: a slider caused to move forward and rearward together with the spool shaft by rotation of the handle shaft; and a guide shaft guiding the slider to slide in a front-rear direction, with respect to the handle shaft, the rear portion of the spool shaft and the guide shaft are disposed so as to be separated on a lower side and an upper side, respectively, and a concave portion receiving at least part of the handle shaft is formed in a portion of the slider opposed to the handle shaft.

9. The fishing spinning reel according to claim 1, wherein the body includes a wall portion and a tube portion extending from the wall portion, the side opening portion is provided at an end portion of the tube portion, the lid member is fastened to the side opening portion by being screwed itself thereinto, a support rib extending in a top-bottom direction is disposed on an inner side of the tube portion, and an upper end portion and a lower end portion of the support rib are connected to an inner peripheral surface of the tube portion, so that the tube portion and the support rib are provided so as to be integral with each other.

10. The fishing spinning reel according to claim 9, wherein the support rib is provided in a protruding manner so as to be integral with the wall portion.

11. The fishing spinning reel according to claim 9, wherein the support rib supports the rear bearing.

* * * * *